May 5, 1970  D. H. LISS  3,510,183
HOLLOW BEARING BALL
Filed May 7, 1968
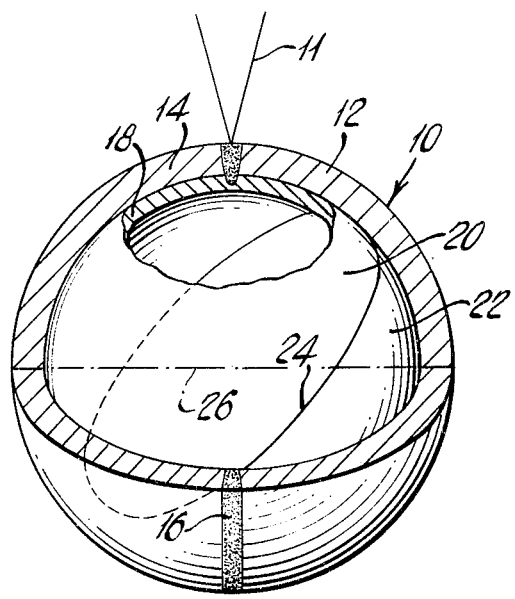
INVENTOR
DONALD H. LISS
BY
Hopgood & Calimafde
ATTORNEYS 3,510,183
HOLLOW BEARING BALL
Donald H. Liss, Newington, Conn., assignor to Textron Inc., Providence, R.I., a corporation of Delaware
Filed May 7, 1968, Ser. No. 727,291
Int. Cl. F16c 19/00
U.S. Cl. 308—188   7 Claims

ABSTRACT OF THE DISCLOSURE

A hollow bearing ball structure is shown wherein an inner shell is provided snugly fitted within the inside wall of an outer shell. The inner shell is formed of two mating sections and prevents the intrusion of weld material from the joining of the outer shell halves, and maintains accurately aligned abutment with the outer shell halves. An electron beam is used to weld the seam formed by the two outer shell halves by fusing the material to a depth at least as great as the thickness of the outer shell but less than the combined thickness of the two shells. Alternatively, the outer shell seam may be bonded by a diffusion-bonding process.

---

Generally, hollow bearing balls rotate at such high speeds that any internal stresses or cracks or imbalance will reduce their life considerably. For instance, a hollow ball made of two welded half spheres ordinarily would be so welded that a proper bead would form on the internal side of the seam. Such beads are recommended to avoid unusually high stress points accompanying weld seams where the weld terminates short of the surface.

A weld bead, however, introduces a slight imbalance and since the bead goes around the inside of the ball, the operation of such welded hollow ball is unsatisfactory. The inside bead appears to sufficiently influence the axis of rotation of the ball to cause the ball to favor rotation on its weld seam. Well balanced balls, however, do not favor any one axis of rotation and during operation turn about any axis in an irregular manner, and this distributes the wear about its entire surface. As a result, the hollow ball with the internal bead has a reduced life.

The control of the weld depth along the seam is thus extremely important but unfortunately not easily controlled. Of the multitude of known welding processes, none appears to satisfactorily control the depth of the weld and provide a simple economical process for manufacturing hollow balls.

It is, therefore, an object of this invention to provide a hollow bearing ball wherein a double-shell structure is employed, the inner shell preventing the protrusion of weld material into the internal cavity and assuring a through-weld of the outer shell.

It is another object of this invention to assure accurately aligned abutment of the two hollow shells to reduce imbalance.

It is a further object of this invention to provide a construction method for manufacturing a hollow bearing ball, wherein the weld-material flow is carefully controlled.

Another object is to provide an improved hollow bearing ball having inherently reduced imbalance, thereby achieving longer life for the ball and for the races in which it is ultimately run.

These objects are accomplished by a ball construction delineated in the following description, in conjunction with the accompanying drawing showing a cross-sectional view of a spherical bearing ball of the invention.

In the drawing, an outer hollow-ball shell 10 is shown. This hollow ball is made of two halves 12 and 14 mated along a seam 16. Within the hollow shell 10 is an inner hollow shell 18 also spherically shaped and made of two mating sections 20 and 22. The inner shell 18 need not be made of two mating halves but could consist of a uniform unitary spherical shell. These half sections of the inner shell are mated along a seam 24 and as illustrated in the figure are so oriented that the seams 16 and 24 have a minimum overlap. It is realized that the half sections 20 and 22 can be so oriented that the seam 24 is substantially transverse to the seam 16 but for practical purposes a fractional offset of the type shown in the drawing is adequate to establish the minimum overlap. Stated in other words, the seam for each shell is substantially a great circle, but the planes of the two great circles are intersective but non-coincident. The inner shell 18 is sized to snugly fit adjacent the inner surface of the outer shell 10. The half sections of the inner shell 18 are not welded together and therefore are carefully mated to fit along the seam 24. Alternatively the inner shell may at the time of assembly be already in the form of a completed closed hollow structure such as a sphere or substantially spherical.

In the welding of the seam 16, I preferably use an energized beam such as a beam of charged particles. The deep penetration of an electron beam 11 into a material is particularly useful for welding my hollow ball structure. In such welding, the beam 11 is generated from a cathode (not shown) and is accelerated and focused onto the welded seam 16. The beam power and power density are adjusted so that the beam penetrates into the material along the seam to a depth that is greater than the outer shell 10 but is less than the combined thickness of the inner and outer shell. The electron beam welding process is very rapid, and a strong weld may be made. Advantageously with the electron beam the half sections 20 and 22 of the inner shell are firmly connected to the outer bearing 10 as the beam fuses the material along the outer seam 16. At the points where the beam 16 crosses the seam 24 some slight weld material may protrude within the internal cavity but generally the close fitting of the internal shell sections 20 and 22 presents such a tight seam 24 that this protrusion is minimized. In the case where the inner shell is spherical before welding the outer shell there will be no weld material at all protruding into the hollow chamber.

An alternate approach for welding the seam 16 is by diffusion bonding. This is accomplished by first cleaning the abutting surfaces along the seam 16, followed by the simultaneous steps of pressurizing the surfaces along the axis 26 (i.e. normal to the plane of seam 16) and the application of heat along the seam 16 for a time period necessary to cause the surfaces to bond by diffusion. In such case, no material is melted but any tendency to produce an upsetting of weld material inwardly from the seam 16 is prevented by the inner shell 18.

The advantages accompanied by the use of the inner shell are evidenced by a well-balanced hollow bearing ball having a bond between half sections that extends throughout the entire seam. Weld material drop-through, internal seam beads and internal material splatter have thus been eliminated by my invention, and extended life is achieved.

I claim:
1. A hollow bearing-ball structure without internal weld-material protrusion, comprising, in combination, a hollow outer spherical shell of edge-abutting interfitting metal component parts of uniform radial thickness, and a hollow inner metal shell of uniform radial thickness concentrically positioned within said outer shell and snugly fitted adjacent the inner surface of said hollow outer shell, said outer-shell parts being radially inwardly fused at their abutting edges and to a fusion depth enter- ing but short of full penetration of the thickness of said inner shell.

2. A ball structure according to claim 1, in which said outer shell comprises two like complementary hemispherical sections.

3. A ball structure according to claim 2, in which said inner shell comprises two like complementary hemispherical sections, wherein the edge-abutting plane of said inner-shell sections is non-coincident with the plane of fusion of the edge-abutted outer-shell sections.

4. A method for manufacturing a hollow bearing ball structure without protrusion of material within the ball, which comprises placing an inner hollow shell within an outer hollow shell composed of two spherical sections mated along a seam, and bonding said two sections along said seam, with radially inward fusion to a depth greater than the thickness of said outer shell and less than the combined thickness of said shells.

5. The method as recited in claim 4, wherein said bonding step comprises focusing a generally radially inwardly directed beam of charged particles on said seam to fuse and weld the material along the seam to said depth.

6. The method as recited in claim 4, wherein said bonding step comprises externally applying heat and pressure across said seam to diffusion-bond the sections at said seam.

7. The method for making a hollow bearing ball structure as recited in claim 4, wherein said placing step further comprises placing an inner hollow shell composed of two spherical portions mated along a first seam within an outer hollow shell composed of two spherical sections mated along a second seam, orienting said inner hollow shell within said hollow outer shell to minimize the overlap of the first and second seams.

References Cited

UNITED STATES PATENTS

| 2,177,928 | 10/1939 | Kundsen | 29—148.4 XR |
| 2,414,672 | 1/1947 | Sauer | 273—63 |
| 3,181,864 | 5/1965 | Rolke | 273—63 |

MARTIN P. SCHWADRON, Primary Examiner

FRANK SUSKO, Assistant Examiner